No. 727,474. PATENTED MAY 5, 1903.
C. STAAFF.
BROODER.
APPLICATION FILED AUG. 27, 1902.
NO MODEL.

WITNESSES:
Paul Hunter
C. R. Ferguson

INVENTOR
Charles Staaff
BY
ATTORNEYS.

No. 727,474. Patented May 5, 1903.

UNITED STATES PATENT OFFICE.

CHARLES STAAFF, OF PEAPACK, NEW JERSEY, ASSIGNOR OF ONE-HALF TO WILLIAM S. FUHRMAN, OF PEAPACK, NEW JERSEY.

BROODER.

SPECIFICATION forming part of Letters Patent No. 727,474, dated May 5, 1903.

Application filed August 27, 1902. Serial No. 121,219. (No model.)

*To all whom it may concern:*

Be it known that I, CHARLES STAAFF, a citizen of the United States, and a resident of Peapack, in the county of Somerset and State of New Jersey, have invented new and useful Improvements in Brooders, of which the following is a full, clear, and exact description.

This invention relates to improvements in brooders or hovers for chickens, the object being to provide a brooder of very simple construction, that may be manufactured at a small cost, and by means of which a practically even temperature may be maintained.

I will describe a brooder embodying my invention and then point out the novel features in the appended claims.

Reference is to be had to the accompanying drawings, forming a part of this specification, in which similar characters of reference indicate corresponding parts in both figures.

Figure 1:
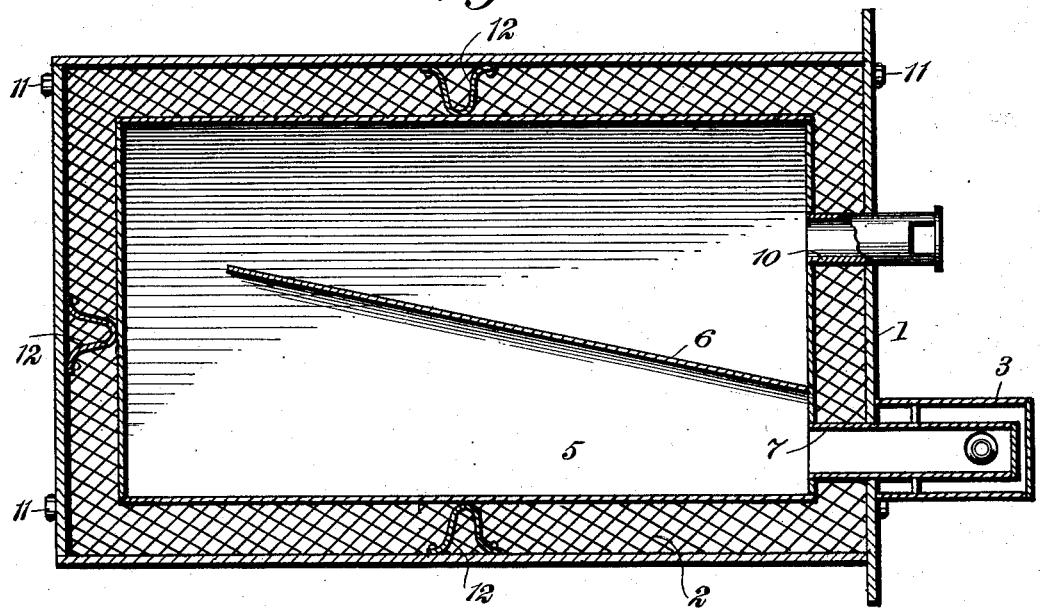
Figure 2:
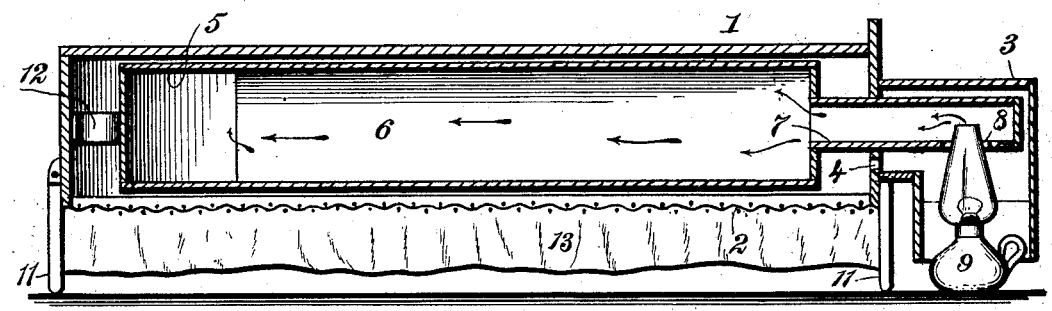

Figure 1 is a horizontal section of a brooder embodying my invention, and Fig. 2 is a vertical section thereof.

The brooder comprises a casing 1, closed at its top, sides, and ends and having a foraminous bottom 2. At one end of the casing is a hood 3, open at its lower end and communicating with the interior of the casing through an opening 4. Arranged within the casing is a heating-box 5, consisting of metal or other suitable material.

A partition 6 is arranged in the heating-box and extends from the forward end at an angle to a point near the rear end. At one side of the partition 6 a tube 7 leads outward through the front wall of the casing and into the hood 3, and within the hood this tube 7 is provided with an opening 8 to receive a heating device, here shown as a chimney of a lamp 9. At the other side of the partition 6 is a tube 10, which leads through the front wall of the casing and has an opening or openings for the escape of air. The casing when in use is supported on legs 11, which are pivotally connected to the casing 1. When not in use, the legs may be folded up against the casing.

To prevent movement of the heating-box within the casing, loops or brackets 12 are provided, the said loops or brackets being attached to the walls of the casing and engaging against the walls of the box. Curtains 13 are suspended from the lower edges of the casing at the sides and ends.

The casing 5 will in practice be lined with asbestos to prevent danger from fire and to better retain the heat.

My invention requires but a small lamp as a heating device, and the consumption of oil is comparatively little. Furthermore, my invention may be applied to any suitable packing-box or to a specially-constructed brooder.

In operation it is obvious that the heat from the lamp will pass into the heating-box along one side of the partition 6 and thence along or through the box at the opposite side and out through the tube 10. Thus a continuous current of hot air or heated air will be provided. The atmospheric air will pass into the hood 3 and thence through the opening 4 into the casing 1, where it will be heated by radiation from the heating-box and kept at a comparatively even temperature. The brooder of course may be placed in a room or in a suitable outer casing or box.

Having thus described my invention, I claim as new and desire to secure by Letters Patent—

1. A brooder comprising a casing having a foraminous bottom, a hood on the casing and communicating therewith, a heater-box in the casing, a partition in the box extending at an angle from one end to nearly the other end, a tube extending from the box at one side of the partition into said hood and having an opening, and an outlet-tube extending from the box at the opposite side of the partition.

2. A brooder comprising a casing having a foraminous bottom, a heater-box arranged in the casing, brackets extending from the walls of the casing and engaging with the box, a partition extending from one end of the box nearly to the opposite end, a hood on the casing and communicating therewith, a tube extending from the box at one side of the partition into said hood and having an opening to receive a lamp-chimney, an outlet-tube extending from the box at the opposite side of the partition, legs for supporting the casing, and curtains suspended from the casing.

3. A brooder comprising a casing having a foraminous bottom, a heater-box arranged in the casing, brackets extending from the walls of the casing and engaging with the box, a partition extending from one end of the box nearly to the opposite end, a hood on the casing and communicating therewith, a tube extending from the box at one side of the partition into said hood and having an opening to receive a lamp-chimney, and an outlet-tube extending from the box at the opposite side of the partition.

In testimony whereof I have signed my name to this specification in the presence of two subscribing witnesses.

CHARLES STAAFF.

Witnesses:
 WILLIAM S. FUHRMAN,
 FRANK H. SCHERER.